US010324692B2

(12) United States Patent
Alabes et al.

(10) Patent No.: US 10,324,692 B2
(45) Date of Patent: Jun. 18, 2019

(54) INTEGRATION FOR NEXT-GENERATION APPLICATIONS

(71) Applicant: Oracle International Corporation, Redwood Shores, CA (US)

(72) Inventors: Tomas Alabes, Foster City, CA (US); Pablo Schmid, Foster City, CA (US); Fernando Alurralde Iturri, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/449,787

(22) Filed: Mar. 3, 2017

(65) Prior Publication Data

US 2018/0074799 A1    Mar. 15, 2018

Related U.S. Application Data

(60) Provisional application No. 62/395,381, filed on Sep. 16, 2016, provisional application No. 62/395,341, filed on Sep. 15, 2016.

(51) Int. Cl.
*G06F 17/30* (2006.01)
*G06F 8/38* (2018.01)
(Continued)

(52) U.S. Cl.
CPC .............. *G06F 8/38* (2013.01); *G06F 16/972* (2019.01); *G06F 17/2247* (2013.01); *G06F 17/2264* (2013.01)

(58) Field of Classification Search
CPC .... G06F 8/20; G06F 11/3668; G06F 17/2247; G06F 17/30923; G06F 16/972; G06F 17/2264; G06F 8/38
See application file for complete search history.

(56) References Cited

U.S. PATENT DOCUMENTS

| 8,132,191 B2* | 3/2012 | Stall ..................... G06F 9/451 719/329 |
| 8,572,033 B2* | 10/2013 | Shukla ............... G06F 9/44505 707/620 |

(Continued)

OTHER PUBLICATIONS

Patrick Steele-Idem , "Bypassing Express View REndering for Speed and Modularity", publisher: StrongLoop, published: Nov. 2014, pp. 1-5 (Year: 2014).*

(Continued)

*Primary Examiner* — Wilson W Tsui
(74) *Attorney, Agent, or Firm* — Trellis IP Law Group, PC

(57) ABSTRACT

Implementations generally relate to system integration. In some implementations, a method includes receiving, at an integration layer of a client device, process information from a JavaScript-based user interface (UI) development framework on the client device, where the process information includes command information and event information that is structured in a JavaScript format, where the process information enables one or more webpages to be rendered in a browser, and where the UI development framework is managed by a Java-based application development framework (ADF) on the client device. The method further includes determining a predetermined communication phase of the ADF, where the ADF communicates with a server during the predetermined communication phase. The method further includes sending the process information to the ADF based on the predetermined communication phase of the ADF, where the ADF converts the process information from the JavaScript format into an extensible markup language (XML) format and sends the process information in the XML format to the server.

14 Claims, 7 Drawing Sheets

(51) Int. Cl.
    *G06F 17/22*       (2006.01)
    *G06F 16/958*      (2019.01)

(56) References Cited

U.S. PATENT DOCUMENTS

| | | | | |
|---|---|---|---|---|
| 8,615,708 | B1* | 12/2013 | Hidayat | G06F 17/2247 |
| | | | | 715/235 |
| 9,075,833 | B2* | 7/2015 | Gao | G06F 17/30292 |
| 9,690,461 | B2* | 6/2017 | Holler | G06F 3/04842 |
| 2009/0094609 | A1* | 4/2009 | Burukhin | G06F 9/454 |
| | | | | 718/104 |
| 2010/0031233 | A1* | 2/2010 | Li | G06F 8/36 |
| | | | | 717/106 |
| 2010/0242018 | A1* | 9/2010 | Balfe | G06F 8/20 |
| | | | | 717/118 |
| 2014/0122996 | A1* | 5/2014 | Gupta | G06F 9/4443 |
| | | | | 715/234 |
| 2016/0011730 | A1* | 1/2016 | Rajasekar | G06F 9/4443 |
| | | | | 715/735 |

OTHER PUBLICATIONS ("What is Middleware? A Guide to Choosing Your Software", published: Jul. 2016, publisher: nuwavetech.com, pp. 1-3 (Year: 2016).*

* cited by examiner

US 10,324,692 B2

INTEGRATION FOR NEXT-GENERATION APPLICATIONS

CROSS REFERENCES TO RELATED APPLICATIONS

This application claims priority from U.S. Provisional Patent Application Ser. No. 62/395,381, entitled INTEGRATION FOR NEXT-GENERATION APPLICATIONS, filed on Sep. 16, 2016 (Trellis ref ORACP0162P/Client ref. ORA170291-US-PSP), and U.S. Provisional Patent Application Ser. No. 62/395,341, entitled SYSTEM FOR PROCESS CLOUD SERVICE, filed on Sep. 15, 2016 (Trellis ref ORACP0192P/Client ref. ORA170390-US-PSP), which are hereby incorporated by reference as if set forth in full in this application for all purposes.

BACKGROUND

Efficient, adaptable, and insightful management systems and methods can be particularly important in enterprise applications, where accurate management and informed decision making can enhance enterprise profits. Some management systems improve corporate performance by managing and optimizing a company's processes. Such systems enable organizations to be more efficient and effective. Older generation components of management systems can be slow and outdated. Upgrades to management systems can be time consuming and resource intensive.

SUMMARY

Implementations described herein generally relate to system integration. In some embodiments, a non-transitory computer-readable storage medium carries one or more sequences of program instructions thereon. When executed by one or more processors, the instructions cause the one or more processors to perform operations including receiving, at an integration layer of a client device, process information from a JavaScript-based user interface (UI) development framework on the client device, where the process information includes command information and event information that is structured in a JavaScript format, where the process information enables one or more webpages to be rendered in a browser, and where the UI development framework is managed by a Java-based application development framework (ADF) on the client device. The instructions further cause the one or more processors to perform operations including determining a predetermined communication phase of the ADF, where the ADF communicates with a server during the predetermined communication phase. The instructions further cause the one or more processors to perform operations including sending the process information to the ADF based on the predetermined communication phase of the ADF, where the ADF converts the process information from the JavaScript format into an extensible markup language (XML) format and sends the process information in the XML format to the server.

A further understanding of the nature and the advantages of particular embodiments disclosed herein may be realized by reference of the remaining portions of the specification and the attached drawings.

DETAILED DESCRIPTION OF EMBODIMENTS

Figure 1:
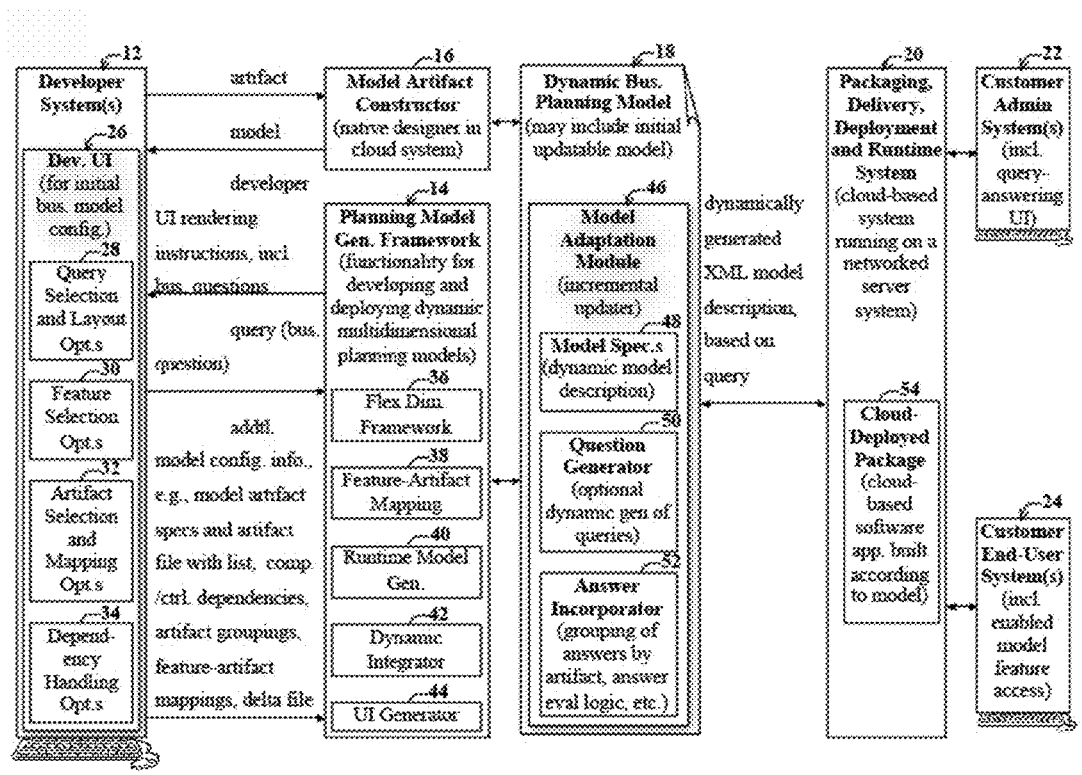
FIG. 1 illustrates an example block diagram of a system, which may be used for implementations described herein.

Implementations described herein generally relate to system integration. In various implementations, an integration layer functions to enable communication between applications at a user interface development framework and web services at a server. In various implementations, the user interface development framework is a web framework that enables users such as developers build user interfaces. In various implementations, the user interface development framework is a JavaScript extension toolkit (JET).

Implementations also provide integration between the integration layer and an application development framework (ADF). As described in more detail herein, process information passes from the JET system to the integration layer to the ADF system to the server. Information passes from the server to the integration layer to the JET system.

As described in more detail herein, the ADF system and the JET system are web frameworks, where the JET system is to be phased in and the ADF system is to be phased out. 305. In other words, the JET system replaces the ADF system. ADF and JET are two technologies that were not initially designed to co-exist. However, implementations integrate ADF and JET systems in a manner that both could co-exist, and implementations make the best use of a new stack provided by the JET system. This enables software systems such as software management systems to incorporate the JET system and eventually phase out the ADF system. In various scenarios, JET is adopted because it uses JavaScript, which is growing in usage. ADF uses extensible markup language (XML) format, which is becoming obsolete yet is still being used. In the meantime, the ADF system may be used to communicate with a server using XML until the ADF system is eventually phased out. Until ADF system 305 is completely phased out, the ADF system continues to function as an intermediary communication module between the integration layer and the server.

In various implementations, the server and client communicate using a type of JavaScript format referred to as JavaScript object notation (JSON) format. With this, implementations creatively bypass the ADF's client-side model, and build an integration with the server interface defined by the ADF system.

To make the server-client communication work, an ADF component serves as a communication pipe, and properly interfaces between the server and client. Both the server and client are able to communicate with each other through a defined JavaScript, which is an open-standard format for structure data that uses human-readable text to transmit data objects consisting of attribute-value pairs. As described in more detail herein, the client generates process information at a process composer unit. The process information is intended for the server. The process composer unit sends the process information to the integration layer in messages in the JavaScript format (e.g., as JSON data). The integration layer sends those messages to the ADF system. The messages are converted to a second format at the ADF system, where he second format may be in an XML format. The ADF system sends the process information in messages in the XML format to the server, which responds with process information in messages in the JavaScript format.

In various implementations, an enterprise may be any organization of persons, such as a business, university, government, military, and so on. The terms "organization" and "enterprise" are employed interchangeably herein. A talent management system or application may be any software application or functionality for facilitating selecting, organizing, or managing enterprise personnel or tasks performed thereby. Personnel of an organization may include any persons associated with the organization, such as employees, contractors, board members, and so on.

Software functionality may be any function, capability, or feature, e.g., stored or arranged data, that is provided via computer code, e.g., software. Generally, software functionality may be accessible via use of a user interface (UI), and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

In various implementations, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, where the input affects a UI display screen and/or accompanying software application associated with the software.

A UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view or window. Views or windows may include sections, such as sub-views or sub-windows, dialog boxes, graphs, tables, and so on. In certain cases, a UI display screen may refer to all application windows presently displayed on a display. The terms UI display screen and screen may be employed interchangeably herein.

A UI display screen generated by a networked software application and accessible via a browser is called an application page (or simply page) herein. A UI component may be an application page or collection of related or linked pages.

An enterprise computing environment may be any collection of computing resources of an organization used to perform one or more tasks involving computer processing. An example enterprise computing environment includes various computing resources distributed across a network, and may further include private and shared content on intranet web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include human resources (HR) (e.g., enterprise personnel), financial resources, assets, employees, business contacts, sales data, and so on, of an enterprise. Examples of enterprise software include enterprise resource planning (ERP) software for facilitating managing enterprise activities (e.g., product planning, inventory management, marketing, sales, and so on). Example ERP applications include customer relationship management (CRM), human capital management (HCM), business intelligence (BI), enterprise asset management, enterprise asset management, corporate performance and governance applications, and so on.

The terms "enterprise software" and "enterprise application" may be employed interchangeably herein. However, an enterprise application may include one or more enterprise software modules or components, such as UI software modules or components.

Note that conventionally, while certain financial tools, tables, and so on (e.g., balance sheets, cash flow statements, etc.), are standardized, different companies may prefer to maintain and view operational and financial planning data and tasks differently, e.g., in accordance with different business and computing environment requirements. This can be particularly true at granular levels, i.e., where detailed enterprise data must be observed and analyzed in accordance with business planning objectives.

For example, a particular service company may experience substantial compensation expenses (e.g., payments to employees, contractors, etc.), which may represent the primary driver for expense planning. Similarly, a small consulting company may experience substantial travel expenses, which may represent a primary driver for expense planning. Accordingly, two different service companies may base their expense planning on substantially different drivers.

Similarly, different companies may employ different methods of accounting, e.g., a direct method or indirect method of accounting. Accordingly, different companies may rely upon different drivers for handling accounting details.

Furthermore, the granularity of planning (i.e., the level of detail demanded or required) may vary across different companies and/or business types, segments, or other domains. For example, a fast moving consumer goods company may plan revenue by product, market, channel, and segment, whereas an information technology (IT) company may plan revenue by service, market, and customers. Accordingly, different companies may rely upon different drivers for various types of planning.

In addition, while certain companies may prefer to perform business planning using a collection of standard or common drivers and associated software modules and functionality (e.g., standard labor, material, etc.), other companies may prefer to perform direct entry for project expenses, revenue, etc.

Accordingly, different businesses may have different planning requirements or needs, which can be difficult to meet using conventional static business planning modules and associated software applications. Certain implementations discussed more fully below provide systems and accompanying mechanisms and methods for enabling dynamic adaptation of an existing initial business planning model (which may be called a seed model herein), thereby enabling the initial seed planning model to uniquely grow to meet individual or specific needs of a given business or organization.

For clarity, certain well-known components, such as hard drives, processors, operating systems, power supplies, routers, Internet service providers (ISPs), identity management systems, workflow orchestrators, process schedulers, integration brokers, tenant automation systems (TASs), online analytical processing (OLAP) engines, certain web services, virtual machines, middleware, enterprise databases, and so on, are not necessarily explicitly called out in the figures. However, those skilled in the art with access to the present teachings will know which components to implement and how to implement them to meet the needs of a given implementation.

FIG. 1 illustrates an example block diagram of a system 100, which may be used for implementations described herein. In various implementations, system 100 is an enterprise-computing environment configured to enable initial development of a dynamic business planning model 18. In various implementations, system 100 incrementally updates business planning model 18 to meet specific enterprise needs, and uses resulting updated business planning model 18 as part of a cloud-based enterprise software application or service 54 (labeled "Cloud-Deployed Package"). While system 100 performs implementations described herein, in other implementations, any suitable component or combination of components associated with system 100 or any suitable module or module s associated with system 100 may facilitate performing the implementations described herein. In various implementations, system 100 may not have all of the components shown and/or may have other elements including other types of modules instead of, or in addition to, those shown herein.

System 100 includes a developer computer system 12 (labeled "Developer System(s)") that is in communication with a planning model generation framework 14 and a model artifact constructor 16. Computer system 12 may also be referred to herein as the developer system or the developer computer. Model artifact constructor 16 may leverage preexisting functionality, e.g., as may be available via a native designer in a cloud computing system implemented as part of system 100.

Planning model generation framework 14 and model artifact constructor 16 that are leveraged to develop business planning model 18, may further communicate with a packing, delivery, deployment and runtime system and/or computing framework 20 (labeled "Packaging, Delivery, Deployment and Runtime System"). Modules 14-20 may be hosted in a cloud, i.e., a server system accessible via a network, such as the Internet.

A cloud-deployed package 54, i.e., software application, embodying business planning model 18 is may be hosted in the cloud, i.e., cloud-based. For the purposes of the present discussion, cloud-based software may be any software run on one or more servers and accessible to client systems via a network used to communicate with the software.

In some implementations, cloud-deployed package 54 may represent a software application that may provide one or more web services for use by other software applications, and/or may provide cloud-services, e.g., on a subscription basis, to one or more client systems, e.g., a customer administrator system 22 (labeled Customer Admin System (s), and a customer end-user system 24 (labeled Customer End-User System(s). For the purposes of the present discussion, the term "customer" refers to any user, such as an administrator and/or end user, e.g., who may be part of an organization that has access to cloud-deployed package 54.

In some implementations, a developer system 12 accesses model artifact constructor 16 and planning model generation framework 14 via a network, such as the Internet. Developer system 12 may include a browser used to browse to the network address that provides access to functionality provided by model artifact constructor 16 and planning model generation framework 14.

After browsing to a network address allotted for system developers, designers, and/or other qualified personnel, various dynamic model-building functionality is accessible to the developer system, e.g., via various developer UI display screens 26 (labeled "Dev. UI").

Software functionality may be any function, capability, or feature, e.g., stored or arranged data, that is provided via computer code, e.g., software. Generally, software functionality may be accessible via use of a UI, and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

Software functionality, or a set of software functionalities, that is/are associated with or used by a business planning model, is called a model feature (or simply feature) herein. Examples of features include, but are not limited to, software functionality for implementing indirect cash flow statements, income statements, and so on.

For the purposes of the present discussion, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, where the input affects a UI display screen and/or accompanying software application associated with the software. The terms UI control and UI component (or simply component) may be employed interchangeably herein.

A descriptor or characteristic of a business planning model and/or associated UI display screens and/or UI layout, is called a model artifact (or simply artifact) herein. Examples of model artifacts include, but are not limited to metadata (e.g., metadata describing a UI layout or UI model framework), dashboards, business rules, forms, dimensions, and so on.

Artifacts may represent or be associated with categories of features or software functionality. When functionality is associated with a business model artifact, the artifact may be seeded with one or more functionalities or features.

Artifacts and features may be dependent or independent. A dependent artifact or feature is one that relies upon the existence or operation of another artifact or feature for proper functioning. Similarly, an independent artifact or feature may be added to a model without requiring special handling of interdependencies, as discussed more fully below. Examples of potential dependent artifacts include, but are not limited to composite forms, rule sets, and so on.

A valid artifact may be any artifact that may be associated with (e.g., seeded with) one or more features that are available for a business planning model. The availability of a feature to an artifact may be defined in initial business planning model 18, e.g., by a developer using business planning model designer software represented by planning model generation framework 14 and model artifact constructor 16 of FIG. 1.

In some implementations, developer UI display screens 26 include a query-selection UI display screen (and/or set of UI controls) 28, a feature-selection UI display screen 30, an artifact-selection UI display screen 32 (labeled "Artifact Selection and Mapping Opts," and an artifact and feature dependency handling UI display screen 34.

Planning model generation framework 14 includes a flex-dimension framework 36, a feature-artifact mapping module 38, a runtime model generator 40, a dynamic functionality integrator 42 (labeled "Dynamic Integrator"), and a UI generator 44.

Generated, dynamic, business planning model 18, which may be defined by and/or specified via an extensible markup language (XML) document, includes a specification 48 (labeled "Model Specs") of business planning model 18, and optionally, embedded question generator code (or a link to code) 50 and answer incorporator 52, e.g., for facilitating incorporating answers to business questions, as may be provided via the customer administrator system 22 (labeled "Customer Admin System(s)") as discussed more fully below.

Packaging, delivery, deployment, and runtime system 20 hosts and runs deployed cloud-based software package or application 54, also referred to as "cloud-deployed package" 54. Functionality of deployed application 54, also referred to as "cloud-deployed package 54," is accessible to customer end-user client system 24.

Note that in general, groupings of various modules of system 100 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, a question generator 50 and answer incorporator 52 shown as part of dynamic business planning model 18 may instead, or in addition, be incorporated into planning model generation framework 14.

Furthermore, certain modules of planning model generation framework 14 may be implemented client-side, e.g., on developer system 12. In general, certain server-side, i.e., cloud-based modules (e.g., running on a server or server system) may be implemented client-side (e.g., running on a client computer communicating with a server), and vice versa, in a manner different than shown in FIG. 1.

In an example scenario, a business model developer (also called designer herein) employs developer system 12, e.g., artifact-selection screen 32, to specify, access, and/or configure model artifacts, leveraging model artifact constructor 16. Artifact-selection screen 32 presents one or more UI controls (which may provide so-called user options, or simply options) for facilitating developer construction, selection, and configuration of model artifacts, as well as UI controls enabling configuration and/or specification of mappings and/or rules associated with the artifacts. The mappings discussed herein refer to associations between business model artifacts and features, and are also called feature-artifact and/or artifact-feature mappings.

After developing and/or configuring a set of one or more business model artifacts, e.g., by leveraging artifact-selection screen(s) 32 and associated model artifact constructor 16, the resulting artifacts may be stored locally or via the server system that hosts modules 14-20.

Next, in the present example scenario, the developer employs feature-selection screen 30 to select and/or configure a set of business model features. Feature construction and/or selection may also be facilitated via model artifact constructor 16 and/or code run as part of planning model generation framework 14, e.g., via code run on feature-artifact mapping module 38.

After initial selection and/or configuration of a set of one or more model artifacts and one or more model features, the developer may employ one or more UI controls of artifact-selection screen 32 to configure and/or specify initial mappings and/or associated mapping rules that define associations between the configured artifacts and features.

Artifact-selection and mapping screen 32 may include UI controls that leverage the functionality of feature-artifact mapping module 38 of planning model generation framework 14. Feature-artifact mapping module 38 may include additional code for implementing automatic feature-artifact mappings in accordance with groupings of business questions and/or answers to the business questions, e.g., so as to automatically update dynamic business planning model 18, as discussed more fully below.

UI generator 44 of planning model generation framework 14 includes code for generating rendering instructions to render developer-side UI display screens 26, and further includes code for generating rendering instructions for UI display screens of cloud-deployed package 54, which are exposed to customer end-user system 24.

Figure 3:
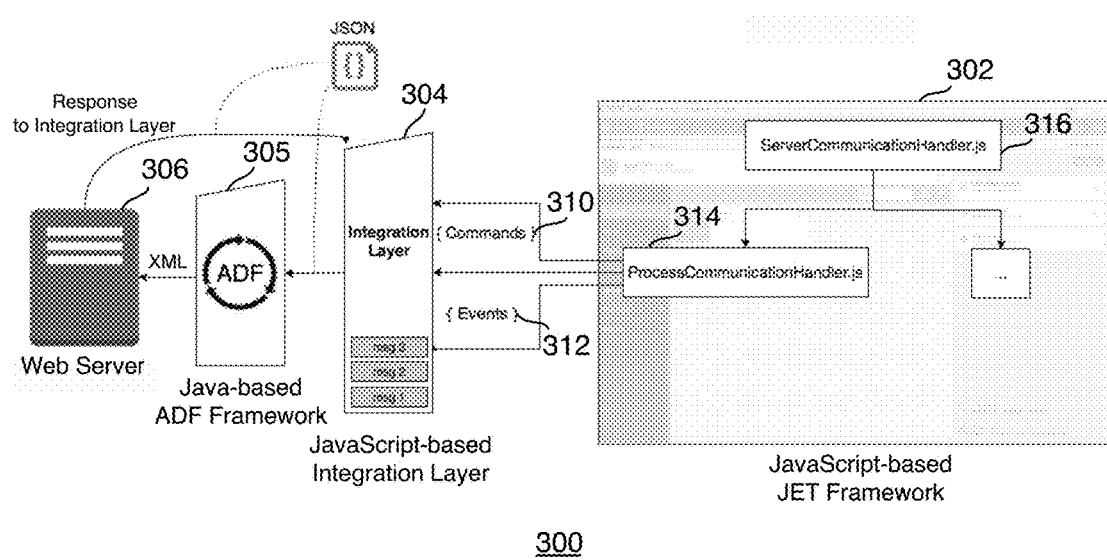
FIG. 3 illustrates an example block diagram of an integration environment, according to some implementations.

Developer-side query-selection and layout options screen 28 includes UI controls and access to associated functionality for defining, selecting, and/or grouping business questions (called queries) to be exposed in a UI display screen accessible to customer administrator system 22. The UI display screens are displayed as part of the dynamic business planning model 18 and are exposed to the customer administrator system 22, and include a UI display screen (an example of which is shown in FIG. 3) that lists business questions that have been enabled for existing dynamic business planning model 18.

The initial business questions selected by a developer using query-selection and layout options screen 28 may be listed and/or otherwise formatted in accordance with developer-selected layout options provided via query-selection and layout options screen 28. UI controls of query-selection and layout options screen 28 provide developer-access to associated functionality (e.g., functionality which may be provided via UI generator 44 and feature-artifact mapping module 38 and/or other modules of planning model generation framework 14) for defining, selecting, and/or otherwise configuring business questions and how the questions will be laid out in a UI display screen exposed to a customer administrator, e.g., via customer administrator system 22.

Mappings of artifacts are grouped by business question or by business question group or type. Mappings of artifacts to features may depend, in part, on the business questions established via use of query-selection and layout options screen 28.

The developer may further specify dependency-handling options via one or more UI controls provided in dependency-handling options screen 34. The dependencies may include dependencies between business questions (e.g., in cases where the answer to one business question may affect other questions or answers, and dependencies between different artifacts (and/or groups or types of artifacts), and dependencies between different features (and/or groups or types of features). Such dependencies may require that a change (e.g., difference) in one question, artifact, and/or feature, be propagated to another question, artifact, and/or feature.

Various implementations discussed herein may employ difference or delta processing to ensure that dependencies are handled without introducing conflicts. This involves referencing the established associations and associated selected configuration options (e.g., as may be specified by a developer via dependency-handling options screen 34) and making adjustments to the business model based thereon and in response to a detected change in an artifact, feature, question, etc.

Accordingly, developer system 12 forwards business question selections and associated identifications, descriptions, and/or configuration information (e.g., as may be provided responsive to developer manipulation of query-selection and layout options screen 28) to business planning model generation framework 14. In addition, various additional UI controls included among developer UI display screens 26 may enable specification and forwarding of additional information to planning model generation framework 14, including, but not limited to additional business model configuration information, e.g., model artifact specifications, an artifact file listing artifacts for an initial business planning model, component (e.g., UI control) dependencies (between UI controls to be rendered and exposed via cloud-deployed package 54), artifact grouping information, feature-artifact mapping data, delta file specifications (e.g., describing dependencies between various questions, artifacts, and/or features), feature specifications, flex dimension configuration parameters and/or specifications, and so on.

Business planning model generation framework 14 then processes the inputs received via developer system 12 to automatically construct an initial business planning model, also called the seed model. Some example modules usable to construct initial dynamic business planning model 18 and to implement incremental updates thereto, include, but are not limited to flex dimension framework 36, feature-artifact mapping module 38, runtime model generator 40, dynamic integrator 42, and UI generator 44.

Flex dimension framework 36 includes computer code for enabling customer administrators (e.g., using customer administrator system 22) and/or customer end users (e.g., using customer end-user system 14) to add flex dimensions to various UI display screens exposed via cloud-deployed package 54. Flex dimension framework 36 then enables extension of business planning model 18 in accordance with the added flex dimensions. Note that whether initial business planning model 18 supports flex dimensions, which flex dimensions, if any, are supported, and behaviors of the flex dimensions, may be specified by a developer via one or more UI controls provided in developer UI display screens 26.

Feature-artifact mapping module 38 includes computer code for enabling automatic implementation of changes introduced to dynamic business planning model 18 in response to answers provided in response to business questions posed to an administrator (or other authorized user) of customer administrator system 22. In particular, when an administrator provides a new answer to a question (e.g., which may be posed via a UI prompt, such as a check box), any artifacts associated with the question are then automatically populated with features via feature-artifact mapping module 38. The resulting populated artifacts are then incorporated into updated dynamic business planning model 18 after any artifact and/or feature dependencies are handled and/or deltas are processed.

Runtime model generator 40 includes computer code for automatically generating a new or updated dynamic business planning model 18 for incorporation into cloud-deployed package 54. The updates to running cloud-deployed package 54 by runtime model generator 40 may be implemented via patching and/or other known technologies for adjusting running software applications.

Dynamic integrator 42, which may communicate with other modules of planning model generation framework 14, facilitates implementing delta differencing processing to accommodate newly added functionality without introducing conflicts in updated business planning model 18. Dynamic integrator 42 may further include computer code for facilitating and/or ensuring efficient interoperability between different intercommunicating business planning models and associated software applications deployed via packaging, delivery, deployment, and runtime system 20.

Note that information exchange between developer system 12 and between various cloud-based modules 14-20 may be implemented via exchange of XML files that are also transferred between the system and modules. Furthermore, dynamic business planning model 18 may be implemented substantially via an XML document defining the model.

In some implementations, dynamic business planning model 18 includes a model adaptation module 46, which includes computer code for facilitating some self-adaptation of dynamic business planning model 18. Note that in other implementations, model adaptation module 46 may be included instead in planning model generation framework 14.

In some implementations, model adaptation module 46 includes, in addition to a description of the business planning model (including a description of existing questions, artifacts, and associated features), a specification of code for dynamic question generator 50 and answer incorporator 52.

Dynamic question generator 50 may include computer code (and/or links thereto) for automatically adjusting a list of business questions exposed via a UI of customer administrator system 22, e.g., in response to one or more answers provided thereby by an administrator using customer administrator system 22. This may be particularly useful for reconfiguring listing of displayed questions in response to an answer to a question that affects the validity of other questions displayed in (or to be displayed among) the listing of business questions.

Answer incorporator 52 may include computer code (and/or links thereto) for adjusting groupings of artifacts by answers and/or answer type or category. Answers to the business questions may be evaluated by evaluation logic to determine how a new listing of questions should be generated and laid out (in the UI exposed to the customer administrator system 22).

Note that various modules 36-44 of the business planning model generation framework 14 may intercommunicate, e.g., via interfacing functionality incorporated therein. Similarly modules 48-52 of model adaptation module 46 of dynamic business planning model 18 may intercommunicate.

Once initial business planning model 18 is developed and/or configured via developer system 12, it can be deployed as cloud-deployed package 54, which is then made available to customer administrator system 22 and customer end-user system 24. The customer administrator may then use customer administrator system 22 to answer business questions. The resulting answers then feed back to framework modules 14-20, which then adapt or update dynamic business planning model 18 in accordance with the answers.

The adjustment to dynamic business planning model 18 is effectuated through use of artifacts, which are then mapped or seeded with features corresponding to the answered questions, and in accordance with the answers to the answered questions, as discussed more fully below.

Accordingly, the present example implementation may enable customers to substantially forgo, configuring and/or updating business planning software. Several business planning processes (which may be associated with different business planning models and/or sub-models) may be selectively and incrementally rolled out to customer end users (e.g., users of customer end-user system(s) 24). Furthermore, integration between added features (e.g., sets of software functionality associated with different business processes) is automatically accommodated, e.g., via dynamic integrator 42 and feature-artifact mapping module 38 of business planning model generation framework 14.

Furthermore, by enabling customer addition of and configuration of flex dimensions to dynamic business planning model 18, the resulting automatically handled dimensions can significantly reduce implementation time for customers to implement new features and associated business model artifacts.

Customers now have significant flexibility and options for configuring various planning business processes. Customers can leverage these configuration capabilities, reduce implementation time, and continue building the model over time, as necessary to meet the needs of the customer organization.

Furthermore, business planning models developed and deployed using system 100 may now readily evolve and adapt to meet different and/or changing business needs while remaining consistent with industry-standard best practices. Furthermore, as best practices change, dynamic business planning model 18 may adapt to comply with the new best practices.

Figure 2:
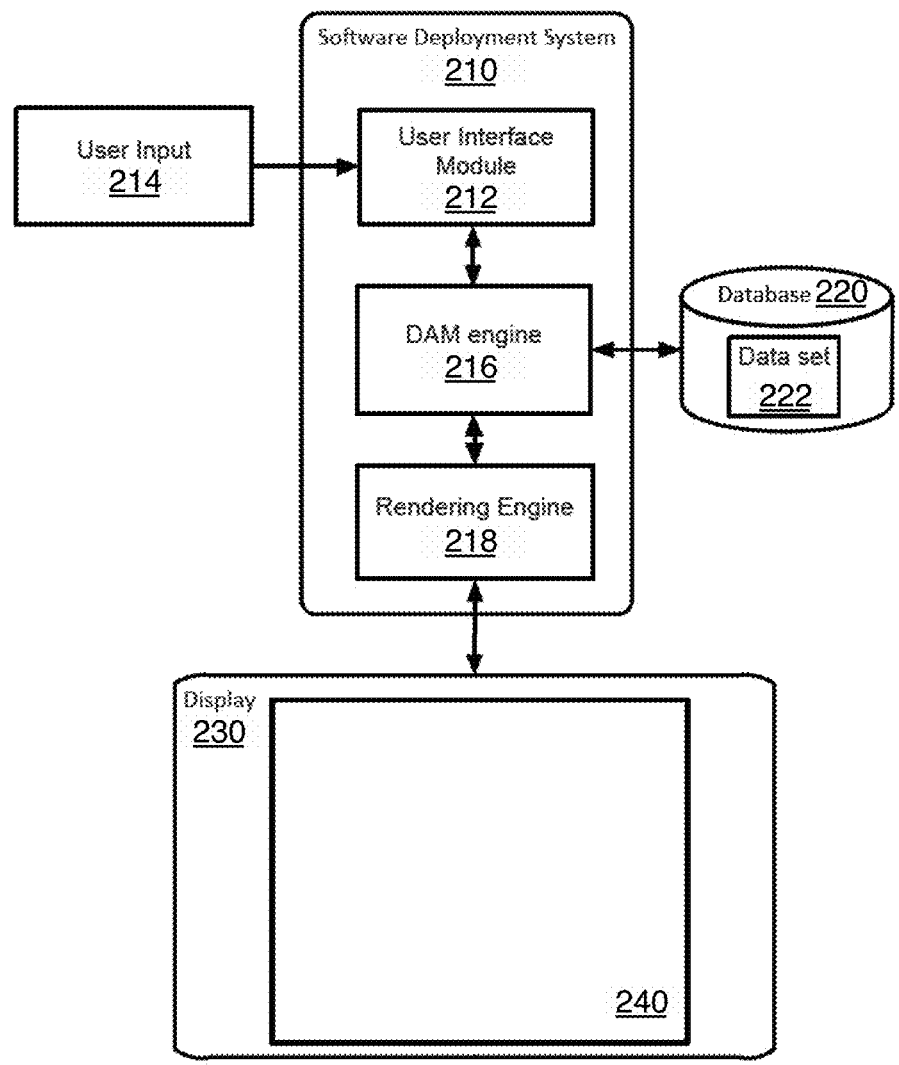
FIG. 2 illustrates an example block diagram of a computing system, which may be used for implementations described herein.

FIG. 2 illustrates an example block diagram of a computing system 200, which may be used for implementations described herein. Computing system 200 provides an interface layer, such as an application program interface (API). The interface layer provides users with seamless connectivity between different instantiations of an application located in different environments (e.g., development environment, production environment, etc.). Computing system 200 may be any computing system, such as an enterprise computing environment, client-server system, and the like.

Computing system 200 also includes software management system 210, also referred to herein as software deployment system 210. Software management system 210 may include a user interface module 212. User interface module 212 may be configured to receive and process data signals and information received from a user interface 214, also referred to herein as user input 214. For example, user interface module 212 may be adapted to receive and process data from user input associated with data for processing via software management system 210. Software management system 210 is configured to process data received from user interface 214, such as a keyboard, mouse, etc. for receiving user input.

Software management system 210 may also include a process engine 216, also referred to herein as digital asset management (DAM) engine 216, and a rendering engine 218. Process engine 216 may be configured as an API or any interface or data structure that may be used to advantage.

In some implementations, computing system 200 may include a data source such as database 220. Database 220 may be connected to the software management system 210 directly or indirectly, for example via a network connection, and may be implemented as a non-transitory data structure stored on a local memory device, such as a hard drive, solid state drive (SSD), flash memory, and the like, or may be stored as a part of a cloud network, as further described herein.

Database 220 may contain one or more data sets 222. Data sets 222 may include data as described herein. Data sets 222 may also include data pertaining to data attributes, data hierarchy, nodal positions, values, summations, types of charts of visualizations, algorithms, code (e.g., C++, Javascript, JSON, etc.), source, security, hashes, XML, and the like. In addition, data sets 222 may also contain other data, data elements, and information such as metadata, labels, development-time information, run-time information, configuration information, API, interface component information, library information, pointers, and the like.

In various implementations, software management system 210 is connected to a display 230 configured to display data 240 (e.g., graphical data, etc.), for example, to a user thereof. Display 230 may be a passive or an active display, adapted to allow a user to view and interact with display data 240 displayed thereon, via user interface 214. In other configurations, display 230 may be a touch screen display responsive to touches, gestures, swipes, and the like for use in interacting with and manipulating display data 240 by a user thereof. Gestures may include single gestures, multi-touch gestures, and other combinations of gestures and user inputs adapted to allow a user to convert, model, generate, deploy, and maintain display data 240.

In various implementations, process engine 216 may be adapted to receive data from user interface 214 and/or database 220 for processing thereof. In one configuration, process engine 216 is a software engine configured to receive and process input data from a user thereof pertaining to display data 240 from user interface 214 and/or database 220 in order to provide the process API layer.

Process engine 216 in other implementations may be configured as a data analysis tool to perform analysis functions associated with display data 240. Such analysis functions may include determining attributes associated with the data, partitions, local and remote pods (layers), communication protocols, determining the relationships to other data, interpreting metadata associated with the data, and the like. For example, process engine 216 may be configured to receive and analyze data sets 222 to determine user interface configuration, data processing instructions, data attributes, data hierarchy, nodes, nodal positions within the hierarchy, values, summations, algorithms, source, security, hashes, and the like, associated with data sets 222.

Process engine 216 may receive existing data sets 222 from database 220 for processing thereof. Such data sets 222 may include and represent a composite of separate data sets 222 and data elements pertaining to, for example, organizational data, which may include employment data, salary data, personnel data, and the like. In addition, data sets 222 may include other types of data, data elements, and information such as contact data, sales data, production data, scientific data, financial data, medical data, census data, and the like.

Rendering engine 218 may be configured to receive configuration data pertaining to display data 240, associated data sets 222, and other data associated with display data 240 such as user interface components, icons, user pointing device signals, and the like, used to render display data 240 on display 230. In one exemplary implementation, rendering engine 218 may be configured to render two-dimensional (2D) and three-dimensional (3D) graphical models and simulations to allow a user to obtain more information about data sets 222. In one implementation, upon receiving instruction from a user, for example, through user interface 214, rendering engine 218 may be configured to generate a real-time display of interactive changes being made to display data 240 by a user thereof.

Note that the computing system 200 presents a particular example implementation, where computer code for implementing embodiments may be implemented, at least in part, on a server. However, embodiments are not limited thereto. For example, a client-side software application may implement software management system 210, or portions thereof, in accordance with the present teachings without requiring communications between the client-side software application and a server.

FIG. 3 illustrates an example block diagram of an integration environment 300, according to some implementations. As shown, the integration environment 300 includes a JavaScript extension toolkit (JET) system 302, an integration layer 304, an application development framework (ADF) system 305, and a server 306, which may be a web server and perform cloud computing and cloud services. In various implementations, JET system 302, integration layer 304, and ADF system 305 are at a client device.

JET system 302 is a JavaScript-based UI development framework on the client device. In operation, JET system 302 handles process information for rendering webpages in a browser, where the process information is structured in a JavaScript format.

ADF system 305 is a Java-based application development framework. ADF system 305 typically manages Java-based UI development framework on the client device. In various implementations described herein, integration layer 304 enables JavaScript-based JET system 302 to bypass the Java-based UI development framework. In various implementations, integration layer 304 functions to enable communication between applications at a user interface application development framework such as JET system 302, and web services at server 306, as well as other functions. In various implementations, JET system 302 is managed by ADF system 305. JET system 302 may be referred to as a component in an ADF system 305 shell.

Various implementations described herein may be implemented by developer computer system 12 of FIG. 1, where the system exchanges process information with dynamic integrator 42 and UI generator 44 of planning model generation framework 14 of FIG. 1. Implementations described herein may also be implemented by software deployment system 210 of FIG. 2.

As indicated herein, in various implementations, JET system 302 is a JavaScript-based UI development framework that enables users such as developers build user interfaces. JET 302 is a complete, modular, open source JavaScript development framework or toolkit that enables users such as developers build user interfaces.

As indicated herein, in various implementations, ADF system 305 is a Java-based application development framework. In various scenarios, ADF system 305 a server-side web framework that is to be phased out, and JET system 302 is a client-side web framework that is to be phased in, to replace ADF system 305. In other words, integration environment 300 is migrating from ADF system 305 to JET system 302, where ADF system 305 is to be entirely replaced with JET system 302. In some implementations, integration layer 304 functions as an intermediary communication system between JET system 302 and ADF system 305. Until ADF system 305 is completely phased out, ADF system 305 continues to function as an intermediary communication module between integration layer 304 and server 306.

In various implementations, JET system 302 sends messages to integration layer 304. The messages may include commands 310 and events 312. The user of JET system 302 may be a web designer.

The messages are sent from any one or more communication handlers such as process communication handler 314, server communication handler 316, etc. of JET system 302. In some implementations, process communication handler 314 handles information between JET system 302 and server 306 (labeled "web server") (via integration layer 304 and ADF system 305). In some implementations, server communication handler 316 defines interactions with server 306. Other handlers may also be available in JET system 302 (e.g., a deployment handler, etc.).

In this particular implementation, process communication handler 314 sends process information such as commands 310 and events 312 to integration layer 304. In various implementations, command information is process information that a user can undo. For example, if a user mistypes some text, the user can undo any typos. Event information is process information that a user cannot undo. For example, if a user clicks on a tool bar button to open a popup or requests information to open a dialogue, the actions are logged and the user cannot undo those actions. Operations of integration layer 304 are described in more detail herein.

Figure 4:
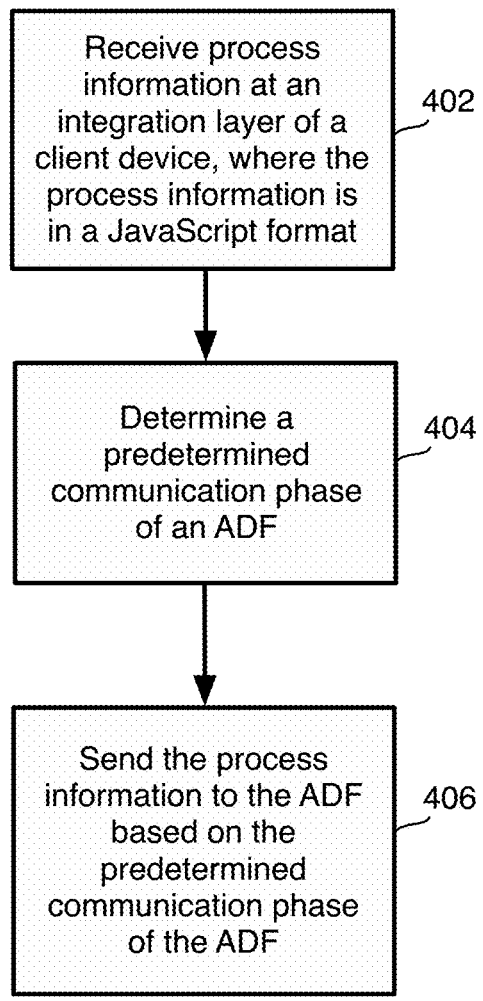
FIG. 4 illustrates an example flow diagram for system integration, according to some implementations.

FIG. 4 illustrates an example flow diagram for system integration, according to some implementations. Referring to both FIGS. 3 and 4, a method is initiated at block 402, where a client device receives at a communication unit or integration layer 304 of a client device, process information from a JavaScript-based UI development framework on the client device, where the process information includes command information and event information that is structured in a JavaScript format. Example implementations of command information and event information are described in more detail herein. In various implementations, the process information enables one or more webpages to be rendered in a browser. In various implementations, the UI development framework is managed by a Java-based application development framework (e.g., ADF system 305) on the client device.

At block 404, the client device determines a predetermined communication phase of the ADF, where ADF system 305 communicates with server 306 during the communication phase. In various implementations, the communication phase is based on a life cycle associated with ADF system 305 and server 306, and where the life cycle enables requests and responses associated with server 306. The life cycle of ADF system 305 is described in more detail herein.

At block 406, the client device sends the process information to ADF system 305 based on the communication phase of ADF system 305, where ADF system 305 converts the process information from the JavaScript format into an extensible markup language (XML) format and sends the process information in the XML format to server 306.

In various implementations, integration layer 304 receiving the process information from the JavaScript-based UI development framework and sending the process information to ADF system 305 enables the JavaScript-based UI development framework to bypass a Java-based UI development framework managed by ADF system 305. Integration layer 304 enables JavaScript-based JET system 302 to replace a Java-based UI development framework. Integration layer 304 also enables JavaScript-based JET system 302 to ultimately replace ADF system 305.

In various implementations, integration layer 304 functions as an intermediary communication system between JET 302 and ADF system 305. Also, the combination of integration layer 304 and ADF system 305 function as intermediary communication systems between JET 302 and server 306.

In some implementations, communication handlers of JET 302 send process information to integration layer 304, where the process information is intended for server 306. In various implementations, the process information is sent in messages that include commands 310 and events 312. In various implementations, the messages are sent from JET 302 to integration layer 304 in a JSON format. Note that the terms process information and messages may be used interchangeably in that process information is transmitted in messages.

As indicated herein, ADF system 305 communicates with server 306 during a communication phase, where the communication phase is based on a life cycle associated with ADF system 305 and server 306. In various implementations, the life cycle has phases that enable requests and responses to be exchanged between the client and server 306 in order to enable webpages to be rendered on the client. In various implementations, the life cycle may also have other phases associated with rendering web pages. For example, some phases may enable web pages to interact with data bindings, call correct binding containers required for web pages, may update values of bindings in the binding container as needed, and may enable data to be rendered in web pages, as well as perform other functions.

In some implementations, there may be a defined lifecycle for server 306 but not necessarily for the client. In such implementations, the communication phase of ADF system 305 is based on the life cycle of system 306. As such, integration layer 304 waits for the communication phase to send commands and other process information to ADF system 305.

Integration layer 304 holds the process information in messages until the ADF lifecycle of ADF system 305 determines that it is time to send them to server 306. In some implementations, integration layer 304 maintains the messages in the same order that integration layer 304 received the messages from JET 302.

When it is time for ADF system 305 to send the process information to server 306, integration layer 304 sends the process information in messages to ADF system 305. In various implementations, the messages are sent from integration layer 304 to ADF system 305 in a JSON format. In some implementations, integration layer 304 sends the messages to ADF system 305 in the same order that integration layer 304 received the messages from JET 302.

ADF system 305 converts the received messages from the JSON format to an XML format. After converting the messages from the JSON format to the XML format, ADF system 305 sends the messages to server 306 in the XML format.

In various implementations, server 306 responds to integration layer 304 with process information that is sent in messages in the JavaScript format (e.g., JSON☐format). Integration layer 304 and the application at JET 302 then processes the messages in the JSON☐format as appropriate. For example, in some implementations, the system may enable users such as developers to create objects such as business objects from a JSON schema. As such, in some implementations, in addition to XML schema definition (XSD), users may create objects from JSON instances. Users may import or paste JSON text and use the JSON-based object as they would an XSD-based object.

As indicated above, in some implementations, ADF system 305 has application life cycles. As such, integration layer 304 receives messages (e.g., commands 310, events 312, etc.) and creates a queue or stack of messages (shown as msg 1, msg 2, and msg 3 in FIG. 3). As indicated herein, the process information includes messages. In some implementations, integration layer 304 maintains the messages, such as commands 310, events 312, and other process information, in the same order that integration layer 304 received the messages. As indicated above, when ADF system 305 is ready, based on its application life cycle, integration layer 304 sends the process information to ADF system 305 in messages in a JavaScript format such as JSON format. In some implementations, Integration layer 304 sends the messages to ADF system 305 in the same order that integration layer 304 received the messages. ADF system 305 coverts the messages to an XML format and sends the process information to server 306 in messages in the XML format. In some implementations, ADF system 305 sends the messages to server 306 in the same order that integration layer 304 received the messages. In some implementations, batches of request messages may be sent together during a communication phase. In some implementations, server 306 returns a batch of response messages corresponding to the batch of request messages.

In various implementations, server 306 responds to received messages (e.g., commands 310, events 312, etc.) by sending the messages to integration layer 304. As such, integration layer 304 receives webpage information directly from server 306, and where the webpage information is in response to the process information received at server 306. In some implementations, server 306 sends such messages to integration layer 304, where the messages contain webpage information that is structured in a JavaScript format. In various implementations, the JavaScript format is a JSON format. After integration layer 304 receives messages from server 306 in the JavaScript format, integration layer 304 performs further steps as needed. For example, integration layer 304 may send the messages from server 306 to JET system 302. In various implementations, integration layer 304 sends the messages from server 306 to JET system 302 in the JavaScript format (e.g., JSON format).

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 5:
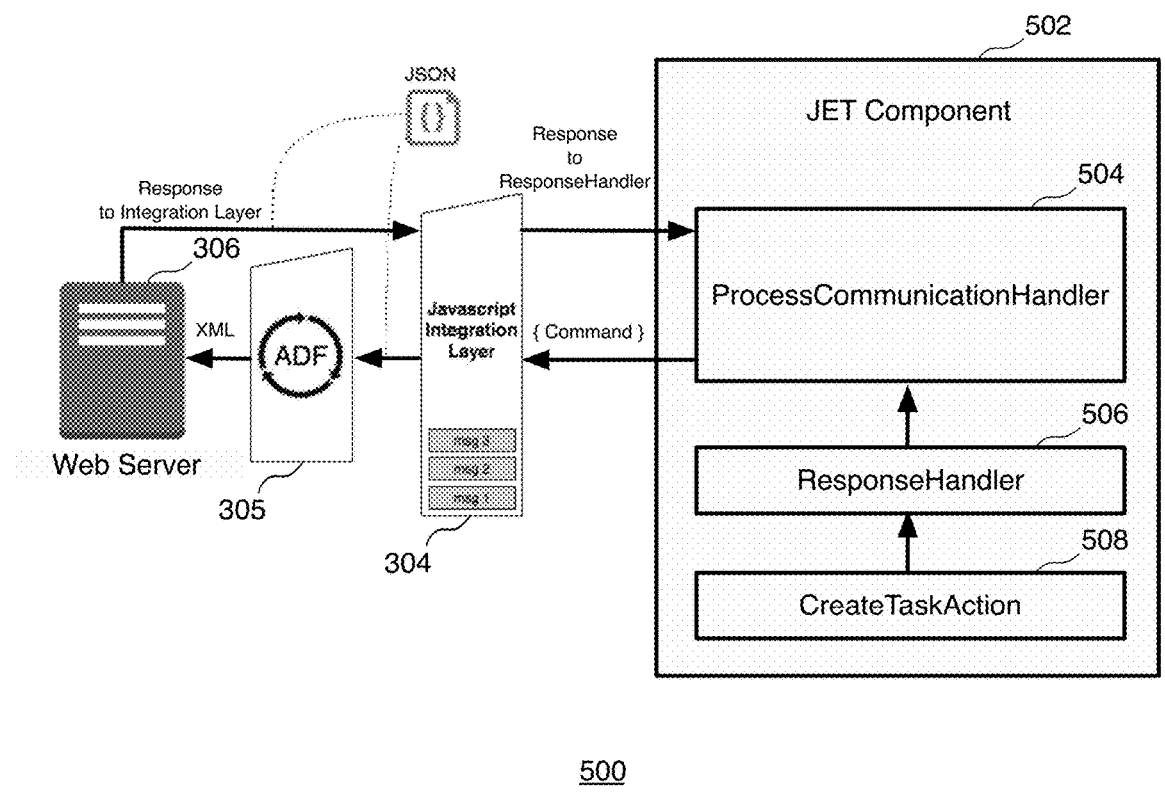
FIG. 5 illustrates an example block diagram of an integration environment 500, according to some implementations.

FIG. 5 illustrates an example block diagram of an integration environment 500, according to some implementations. As shown, the integration environment 500 includes a JET component 502, which may be a component of JET 302 of FIG. 3. Integration environment 500 also includes integration layer 304, ADF system 305, and server 306 introduced in FIG. 3. Shown in JET component 502 is a process communication handler 504, a response handler 506, and a create task action 508. In various implementations, process communication handler 504, response handler 506, and create task action 508 may represent files such as JavaScript files or code inside a JavaScript file.

In some implementations, process communication handler 504 is a proxy between create task action 508 and integration layer 304. In various implementations, integration layer 304 receives messages containing commands and other process information (e.g., events, etc.) from process communication handler 504. Process communication handler 504 may receive commands from various different response handlers.

In some implementations, integration layer 304 creates maps, where integration layer 304 assigns each message received from JET system 502 to a response handler (e.g., response handler 506). In some implementations, each message is mapped to a response handler in a one-to-one mapping. In some implementations, the mapping may also include multiple or all handlers in a communication chain between a given web components in JET system 502 and integration layer 304. When integration layer 304 receives responses from server 506, integration layer 304 may determine from the mapping where to send the webpage information in the responses (e.g., to response handler 506). In some implementations, if a response handler is not specified, integration layer 304 may perform a default behavior or action. Such a default action may be, for example, sending the webpage information to a default response handler. In another example, a default action may be to create and display an error or other notification if particular information is missing or otherwise not available. A notification may be shown in a pop up window to a user or logged, etc.

In an example implementation, create task action 508 may send a command to response handler 506. The command may be a task of fetching data for a webpage, for example. The command may be transmitted in a message. The message is passed from create task action 508 to response handler 506 to communication handler 504 to integration layer 304 to ADF system 305. ADF system 305 sends the message as a request to server 506. Server 506 responds to the request by sending a response to integration later 304. The response contains webpage information. Integration later 304 handles the webpage information accordingly. For example, integration later 304 may send the webpage information of the response to response handler 506 based on a message-to-response handler mapping. Response handler 506 handles the webpage information from server 306, accordingly. For example, response handler 506 may provide the webpage information to create task action 508.

Figure 6:
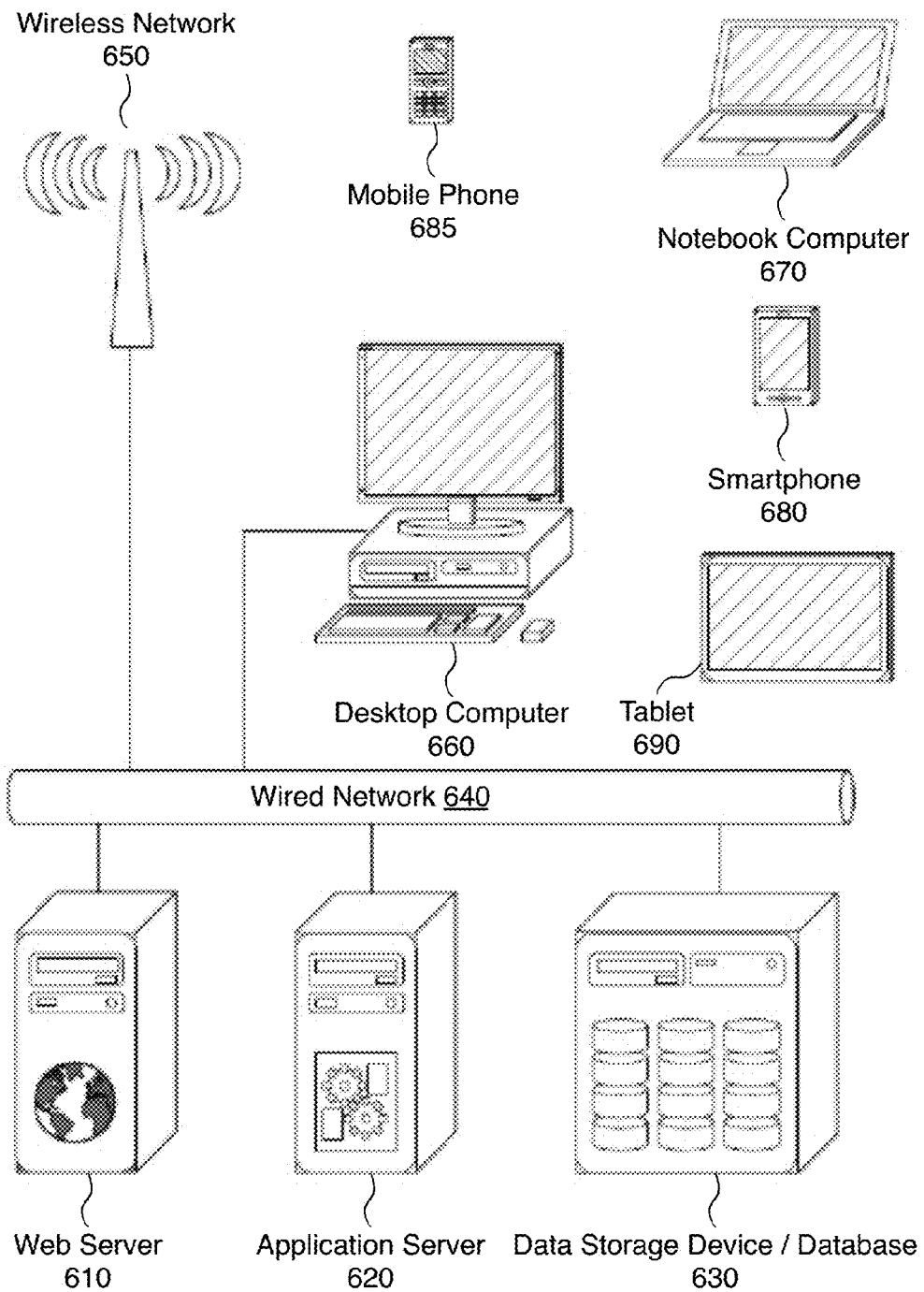
FIG. 6 illustrates an example block diagram of a system, which may be used for implementations described herein.

FIG. 6 illustrates an example block diagram of a system 600, which may be used for implementations described herein. Example system 600 is capable of supporting or running various hardware and/or software modules and associated methods discussed with reference to FIGS. 1-5. Note that certain implementations may be implemented using one or more standalone applications (for example, residing in a user device) and/or one or more web-based applications implemented using a combination of client-side and server-side code. While system 600 performs implementations described herein, in other implementations, any suitable component or combination of components associated with system 600 or any suitable processor or processors associated with system 600 may facilitate performing the implementations described herein. In various implementations, system 600 may not have all of the components shown and/or may have other elements including other types of components instead of, or in addition to, those shown herein.

General system 600 includes user devices 660-690, including one or more desktop computers 660, one or more notebook computers 670, one or more smartphones 680, one or more mobile phones 685, and one or more tablets 690. General system 600 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although system 600 is shown with five user devices, any number of user devices can be supported.

A web server 610 is used to process requests from web browsers and standalone applications for web pages, electronic documents, enterprise data or other content, and other data from the user computers. Web server 610 may also provide push data or syndicated content, such as RSS feeds, of data related to enterprise operations.

An application server 620 operates one or more applications. The applications can be implemented as one or more scripts or programs written in any programming language, such as Java, C, C++, C#, or any scripting language, such as JavaScript or European computer manufacturers association script (ECMAScript), Perl, hypertext preprocessor (PHP), Python, Ruby, or tool command language (TCL). Applications can be built using libraries or application frameworks, such as Rails, Enterprise JavaBeans, or .NET. Web content may be created using hypertext markup language (HTML), cascading style sheets (CSS), and other web technology, including templating languages and parsers.

The data applications running on application server 620 are adapted to process input data and user computer requests and can store or retrieve data from data storage device or database 630. Database 630 stores data created and used by the data applications. In some implementations, database 630 includes a relational database that is adapted to store, update, and retrieve data in response to SQL format commands or other database query languages. Other implementations may use unstructured data storage architectures and Not Only SQL (NoSQL) databases.

In some implementations, application server 620 includes one or more general-purpose computers capable of executing programs or scripts. In some implementations, web server 610 is implemented as an application running on the one or more general-purpose computers. Web server 610 and application server 620 may be combined and executed on the same computers.

An electronic communication network 640-650 enables communication between user computers 660-690, web server 610, application server 620, and database 630. In some implementations, networks 640-650 may further include any form of electrical or optical communication devices, including wired network 640 and wireless network 650. Networks 640-650 may also incorporate one or more local-area networks, such as an Ethernet network, wide-area networks, such as the Internet; cellular carrier data networks; and virtual networks, such as a virtual private network.

System 600 is one example for executing applications according to some implementations. In some implementations, application server 610, web server 620, and optionally database 630 can be combined into a single server computer application and system. In further implementations, virtualization and virtual machine applications may be used to implement one or more of application server 610, web server 620, and database 630.

In still further implementations, all or a portion of the web and application serving functions may be integrated into an application running on each of the user computers. For example, a JavaScript application on the user computer may be used to retrieve or analyze data and display portions of the applications.

In various implementations, system 600 may not have all of the components shown and/or may have other elements including other types of components instead of, or in addition to, those shown herein.

With reference to FIGS. 1, 2, and 6, developer system(s) 12, customer administrator system(s) 22, and customer end-user system(s) 24 of FIG. 1 may be implemented in whole or in part via one or more of desktop computer 660, notebook computer 670, smartphone 680, mobile phone 685, and tablet 690 of FIG. 6 and/or other computing devices such as computing system 200 of FIG. 2. In some implementations, computing devices 660-690 run browsers, e.g., used to display developer UI(s) 26 and UIs of customer administrator system(s) 22 and customer end-user system(s) 24 of FIG. 1. Examples of such UIs are shown in FIG. 3.

In some implementations, browsers of systems 12, 22, 24 of FIG. 1 connect to the Internet, represented by wired network 640 and/or wireless network 650 as shown in FIG. 6, to access one or more network-coupled servers, databases, and/or associated cloud-based functionality, as represented by modules 14-20 of FIG. 1. Note that one or more of web server 610, application server 620, and data storage device or database 630 shown in FIG. 6 may be used to host software corresponding to modules 14-20 of FIG. 1, as detailed more fully below.

In some implementations, model artifact constructor 16, planning model generation framework 14 (including accompanying flex dimension framework 36, feature-artifact mapping module 38, runtime model generator 40, dynamic integrator 42, and UI generator 44), dynamic business planning module 18 and accompanying model adaptation module 46 (including model specifications 48, question generator 50, and answer incorporator 52), and packaging, delivery, deployment, and runtime system 20 (and accompanying cloud-deployed package 54) of FIG. 1 run in a cloud computing environment that includes a collection of plural web servers 610, application servers 620, and data storage devices 630 shown in FIG. 6.

For example, in some implementations, planning model generation framework 14 and model artifact constructor 16 of FIG. 1 run on a process cloud that communicates with a document cloud via an integration mechanism, e.g., middleware, APIs, web services, etc. The document cloud maintains data storage devices 630 of FIG. 6 to maintain data that is generated by customers, e.g., via customer end-user systems 24 of FIG. 1 through use of cloud-deployed package 54. The process cloud in combination with the document cloud act as an overall cloud that supports development, deployment, dynamic adaptation, and use of dynamic software applications and accompanying models (e.g., dynamic business planning model 18 of FIG. 1) shown in FIG. 1.

In general, software developers e.g., users of developer systems 12 of FIG. 1, may subscribe to certain cloud services to facilitate development of software applications and storage of associated files. A cloud service that is configured for software application or process flow development is called a process cloud service (PCS).

A process cloud service may employ a networked database, e.g., data storage device 630 of FIG. 6 or database 220 of FIG. 2, to store files and other objects used by a given software program being developed. Server-side development environments may be accessible to developers via browsers. The development environments may be backed by the PCS, such that developed software application files are stored in the PCS database corresponding to the one or more of data storage devices 630 of FIG. 6 or database 220 of FIG. 2.

A document cloud may include document management functionality in communication with folder structures, and documents and may incorporate functionality for adding rich metadata documents and folders. The document management functionality may include metadata services (MDS) for characterizing folders and documents and associated structures with various types of metadata. The document management functionality may further include software (which may include a combination of webpage code from web server 610 of FIG. 6 and supporting application code of application server 620 of FIG. 6, where the webpage code may call the application code using web services, APIs, etc.) for generating one or more customer UI display screens, e.g., UI display screens presented via browsers of customer administrator systems 22 and customer end-user systems 24 of FIG. 1.

In some implementations, the UI display screens (examples of which are shown in FIG. 3) include accompanying UI controls and associated options. Example options include options to browse, create, delete, define, upload, download, etc., folders, structures, and documents, etc., as maintained via the folder structures and documents.

In some implementations, browsers used by developer system 12, customer administrator system 22, and customer end-user system 24 of FIG. 1, interface with web servers 610 shown in FIG. 6 to access websites and accompanying webpage code, which is backed by applications used to implement modules 16-20 of FIG. 1. The webpage code of web servers 610 of FIG. 6 uses web services, APIs, and/or other interfacing mechanisms to communicate with application software hosted on application servers 620 of FIG. 6 of the cloud, which includes a collection of web servers 610, application servers 620, and data storage devices 630 of FIG. 6.

Various implementations discussed herein may provide substantial benefits in terms of providing efficiencies in systems and methods that achieve a new and useful end as they pertain to new software adaptability. In particular, certain implementations discussed herein uniquely leverage input from customers, the input of which may change over time as user needs change, to enable substantial hereto-for-not possible or practical dynamic software model reconfiguration and/or reconstruction.

Certain implementations may provide virtually automatic incorporation of such inputs into a seamlessly adaptable software package that is responsive to the changing user needs and automatically seamlessly handles software integrations.

Accordingly, various implementations provide new capabilities for efficient software adaptation, in part by uniquely leveraging associations between user-provided answers to questions, sets of software model artifacts, sets of software functionality, and mappings or relationships.

Figure 7:
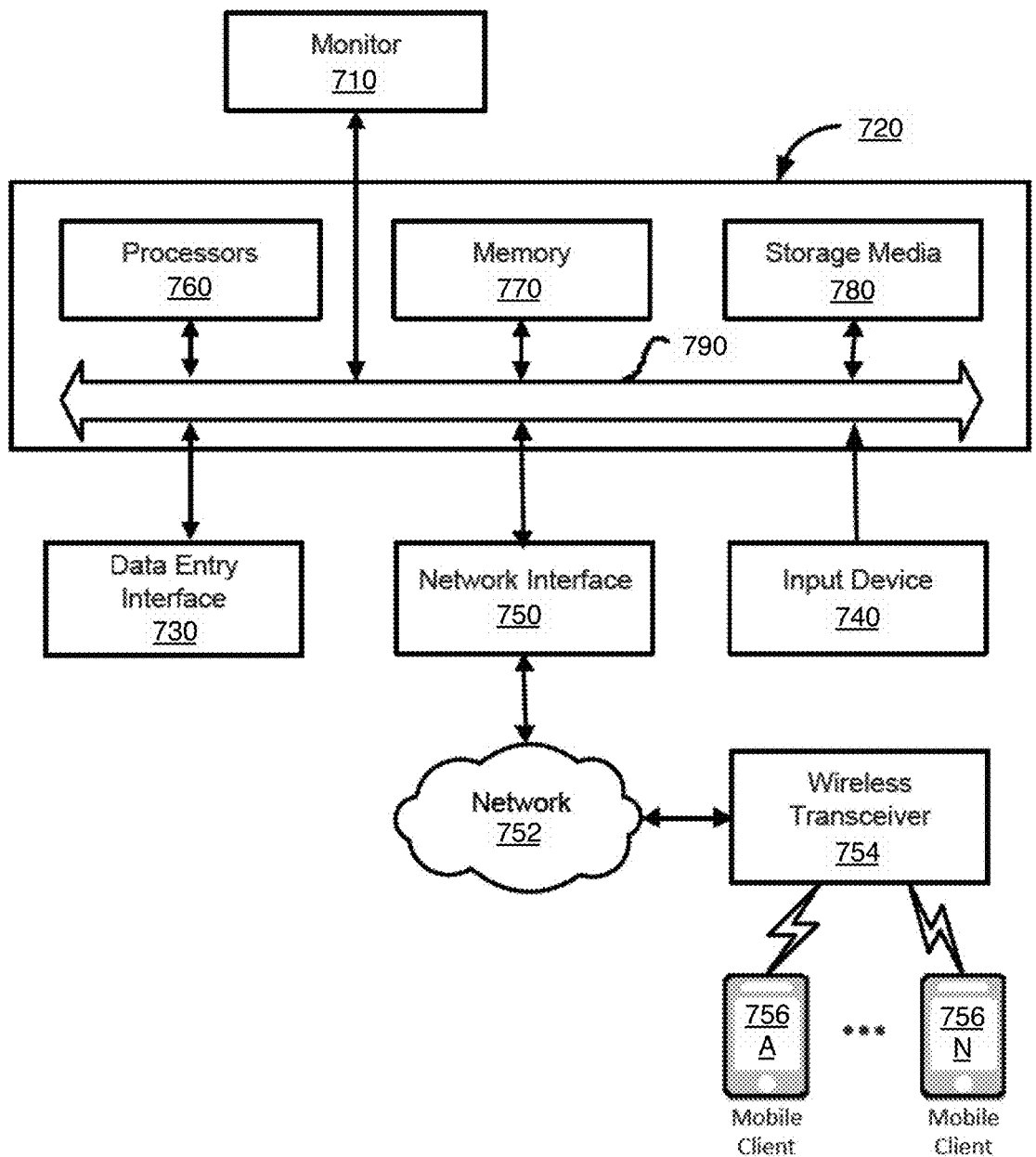
FIG. 7 illustrates an example block diagram of a network environment, which may be used for implementations described herein.

FIG. 7 illustrates an example block diagram of a network environment 700, which may be used for implementations described herein. Network environment 700 is merely illustrative and not intended to limit the scope of the claims. One of ordinary skill in the art would recognize other variations, modifications, and alternatives. For example, network environment 700 may be implemented in a distributed client-server configuration having one or more client devices in communication with one or more server systems.

In one exemplary implementation, network environment 700 includes a display device such as a monitor 710, a computer 720, a data entry interface 730 such as a keyboard, touch device, and the like, an input device 740, a network interface 750, and the like. Input device 740 is typically implemented as a computer mouse, a trackball, a track pad, wireless remote, tablet, touch screen, and the like. Moreover, input device 740 typically allows a user to select and operate objects, icons, text, characters, and the like that appear, for example, on the monitor 710.

Network interface 750 may include an Ethernet card, a modem (telephone, satellite, cable, integrated services digital network (ISDN), etc.), an (asynchronous) digital subscriber line (DSL) unit, and the like. Furthermore, network interface 750 may be physically integrated on the motherboard of computer 720, may be a software program, such as soft DSL, or the like.

Network environment 700 may also include software that enables communications over communication network 752 such as the hypertext transfer protocol (HTTP), transmission control protocol/Internet protocol (TCP/IP), real-time transport protocol/real-time streaming protocol (RTP/RTSP), protocols, wireless application protocol (WAP), Institute of Electrical and Electronics Engineers (IEEE) 802.11 protocols, and the like. In addition to and/or alternatively, other communications software and transfer protocols may also be used, for example Internetwork packet exchange (IPX), user datagram protocol (UDP) or the like.

Communication network 752 may include a local area network, a wide area network, a wireless network, an Intranet, the Internet, a private network, a public network, a switched network, or any other suitable communication network, such as for example cloud networks. Communication network 752 may include many interconnected computer systems and any suitable communication links such as hardwire links, optical links, satellite or other wireless communications links such as Bluetooth, WIFI, wave propagation links, or any other suitable mechanisms for communication of information. For example, communication network 752 may communicate to one or more mobile wireless devices 756A-N, such as mobile phones, tablets, and the like, via a base station such as wireless transceiver 754.

Computer 720 may include familiar computer components such as one or more processors 760, and memory storage devices, such as a memory 770, e.g., random access memory (RAM), storage media 780, and system bus 790 interconnecting the above components. In one embodiment, computer 720 is a PC compatible computer having multiple microprocessors, graphics processing units (GPU), and the like. While a computer is shown, it will be readily apparent to one of ordinary skill in the art that many other hardware and software configurations are suitable for use with implementations described herein. While computer 720 performs implementations described herein, in other implementations, any suitable component or combination of components associated with computer 720 or any suitable processor or processors associated with computer 720 may facilitate performing the implementations described herein. In various implementations, computer 700 may not have all of the components shown and/or may have other elements including other types of components instead of, or in addition to, those shown herein.

Memory 770 and Storage media 780 are examples of non-transitory tangible media for storage of data, audio/video files, computer programs, and the like. Other types of tangible media include disk drives, solid-state drives, floppy disks, optical storage media such as compact disc-read only memory (CD-ROMS) and bar codes, semiconductor memories such as flash drives, flash memories, read-only-memories (ROMS), battery-backed volatile memories, networked storage devices, cloud storage, and the like.

Although the description has been described with respect to particular embodiments thereof, these particular embodiments are merely illustrative, and not restrictive. For example, while various implementations discussed herein address development, deployment, and use of dynamic business planning models used to implement cloud-based enterprise software applications and associated services, implementations are not limited thereto.

Various implementations need not be deployed via an Internet cloud, but instead may be hosted on an internal enterprise server on a local network. Furthermore various implementations may be implemented as desktop software, such that the incremental updating happens on the end-user computer on which the software leveraging the dynamic planning model runs. In addition, implementations are not limited to use in conventional business applications and computing environments, and may be used, for example, by governments, universities, and other organizations to facilitate various types of planning activities. In addition, implementations need not be limited to planning software, but may be used to dynamically update different types of software that may benefit by the ability to dynamically adapt to specific needs and/or changing needs of an organization and/or associated computing environment.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer-readable storage medium carrying program instructions thereon, the instructions when executed by one or more processors cause the one or more processors to perform operations comprising:

establishing an application program interface as an integration layer of a client device configured to function as an intermediary communication system defining a first communication path between a JavaScript-based (JET) user interface (UI) development framework and a Java-based application development framework (ADF) on the client device, wherein the integration layer when combined with the ADF is configured to function as another intermediary communication systems defining a second communication path between the JET UI development framework and a server;

configuring the integration layer as the intermediary communication system between the JET UI development framework and the ADF, forming the first communication path;

receiving, at the integration layer, one or more particular messages comprising process information from the JET UI development framework, wherein the process information includes command information and event information that is structured in a JavaScript format, wherein the process information enables one or more webpages, which further comprise webpage information, to be rendered in a browser, and wherein communication between the JET UI development framework and the server is managed by the ADF through the second communication path;

employing the integration layer to determine a mapping for each of the one or more particular messages received from the JET UI development framework through the first communication path or each one or more specific messages received from the server, to a response handler from one or more response handlers integrated as part of the JET UI development framework, and wherein at least one of the one or more response handlers at the JET UI development framework can process the particular messages or the specific messages received from the server;

determining a life cycle of the server and another life cycle for the ADF, wherein the life cycle includes one or more particular phases that enable requests and responses to be exchanged between the server and the ADF;

determining a predetermined communication phase of the ADF as a time when the ADF communicates with the server during the one or more particular phases through the second communication path;

queuing the particular messages and sending the queued particular messages to the ADF during the predetermined communication phase, wherein the ADF converts the process information from the particular messages from the JavaScript format into an extensible markup language (XML) format and sends the process information in the XML format to the server; and in response to the XML format received at the server, sending from the server one or more of the specific messages comprising the webpage information to the integration layer, and via the mapping, selecting one of the response handlers to communicate the one or more specific messages to the JET UI development framework through a third communication path which bypasses the ADF.

2. The computer-readable storage medium of claim 1, wherein the receiving of the process information from the JET UI development framework and the sending of the process information to the ADF enables the JET UI development framework to bypass a Java-based UI development framework managed by the ADF.

3. The computer-readable storage medium of claim 1, wherein the instructions when executed further cause the one or more processors to perform the queuing by maintaining the particular messages in a same order the integration layer received the particular messages.

4. The computer-readable storage medium of claim 1, wherein the integration layer receives webpage information directly from the server through the third communication path, and wherein the webpage information is structured in the JavaScript format.

5. The computer-readable storage medium of claim 1, wherein the JavaScript format is a JavaScript object notation (JSON) format.

6. A method for system integration, the method comprising:

establishing an application program interface as an integration layer of a client device configured to function as an intermediary communication system defining a first communication path between a JavaScript-based (JET) user interface (UI) development framework and a Java-based application development framework (ADF) on the client device, wherein the integration layer, wherein the integration layer when combined with the ADF is configured to function as another intermediary communication systems defining a second communication path between the JET UI development framework and a server;

configuring the integration layer as the intermediary communication system between the JET UI development framework and the ADF, forming the first communication path;

receiving, at the integration layer, one or more particular messages comprising process information from the JET UI development framework, wherein the process information includes command information and event information that is structured in a JavaScript format, wherein the process information enables one or more webpages, which further comprise webpage information, to be rendered in a browser, and wherein communication between the JET UI development framework and the server is managed by the ADF through the second communication path;

employing the integration layer to determine a mapping for each of the one or more particular messages received from the JET UI development framework through the first communication path or each one or more specific messages received from the server, to a response handler from one or more response handlers integrated as part of the JET UI development framework, and wherein at least one of the one or more response handlers at the JET UI development framework can process the particular messages or the specific messages received from the server;

determining a life cycle of the server and another life cycle for the ADF, wherein the life cycle includes one or more particular phases that enable requests and responses to be exchanged between the server and the ADF;

determining a predetermined communication phase of the ADF as a time when the ADF communicates with the server during the one or more particular phases through the second communication path;

queuing the particular messages and sending the queued particular messages to the ADF during the predetermined communication phase, wherein the ADF converts the process information from the particular messages from the JavaScript format into an extensible markup language (XML) format and sends the process information in the XML format to the server; and in response to the XML format received at the server, sending from the server one or more of the specific messages comprising the webpage information to the integration layer, and via the mapping, selecting one of the response handlers to communicate the one or more specific messages to the JET UI development framework through a third communication path which bypasses the ADF.

7. The method of claim 6, wherein the receiving of the process information from the JET UI development framework and the sending of the process information to the ADF enables the JET UI development framework to bypass a Java-based UI development framework managed by the ADF.

8. The method of claim 6, wherein the method further comprises the queuing maintaining the particular messages in a same order the integration layer received the particular messages.

9. The method of claim 6, wherein the integration layer receives webpage information directly from the server through the third communication path, and wherein the webpage information is structured in the JavaScript format.

10. The method of claim 6, wherein the JavaScript format is a JavaScript object notation (JSON) format.

11. An apparatus comprising:
one or more processors; and
logic encoded in one or more non-transitory computer-readable storage media for execution by the one or more processors and when executed operable to perform operations comprising:
establishing an application program interface as an integration layer of a client device configured to function as an intermediary communication system defining a first communication path between a JavaScript-based (JET) user interface (UI) development framework and a Java-based application development framework (ADF) on the client device, wherein the integration layer when combined with the ADF is configured to function as another intermediary communication systems defining a second communication path between the JET UI development framework and a server;
configuring the integration layer as the intermediary communication system between the JET UI development framework and the ADF, forming the first communication path;

receiving, at the integration layer, one or more particular messages comprising process information from the JET UI development framework, wherein the process information includes command information and event information that is structured in a JavaScript format, wherein the process information enables one or more webpages, which further comprise webpage information, to be rendered in a browser, and wherein communication between the JET UI development framework and the server is managed by the ADF through the second communication path;

employing the integration layer to determine a mapping from for each of the one or more particular messages received from the JET UI development framework through the first communication path or each one or more specific messages received from the server, to a response handler from one or more response handlers integrated as part of the JET UI development framework, and wherein at least one of the one or more response handlers at the JET UI development framework can process the particular messages or the specific messages received from the server;

determining a life cycle of the server and another life cycle for the ADF, wherein the life cycle includes one or more particular phases that enable requests and responses to be exchanged between the server and the ADF;

determining a predetermined communication phase of the ADF as a time when the ADF communicates with the server during the one or more particular phases through the second communication path;

queuing the particular messages and sending the queued particular messages to the ADF during the predetermined communication phase, wherein the ADF converts the process information from the particular messages from the JavaScript format into an extensible markup language (XML) format and sends the process information in the XML format to the server; and in response to the XML format received at the server, sending from the server one or more of the specific messages comprising the webpage information to the integration layer, and via the mapping, selecting one of the response handlers to communicate the one or more specific messages to the JET UI development framework through a third communication path which bypasses the ADF.

12. The apparatus of claim 11, wherein the receiving of the process information from the JET UI development framework and the sending of the process information to the ADF enables the JET UI development framework to bypass a Java-based UI development framework managed by the ADF.

13. The apparatus of claim 11, wherein the logic when executed is further operable to perform the queuing by maintaining the particular messages in a same order the integration layer received the particular messages.

14. The apparatus of claim 11, wherein the integration layer receives webpage information directly from the server through the third communication path, and wherein the webpage information is structured in the JavaScript format.

* * * * *